July 24, 1962  A. C. SAMPIETRO  3,045,773
FRONT WHEEL SUSPENSION SYSTEMS FOR AUTOMOBILE VEHICLES
Filed Sept. 8, 1959  5 Sheets-Sheet 1

INVENTOR
Achille C. Sampietro
BY
Ralph B. Stewart
ATTORNEY

July 24, 1962 A. C. SAMPIETRO 3,045,773
FRONT WHEEL SUSPENSION SYSTEMS FOR AUTOMOBILE VEHICLES
Filed Sept. 8, 1959 5 Sheets-Sheet 2

INVENTOR
Achille C. Sampietro
BY
Ralph B. Stewart
ATTORNEY

July 24, 1962   A. C. SAMPIETRO   3,045,773
FRONT WHEEL SUSPENSION SYSTEMS FOR AUTOMOBILE VEHICLES
Filed Sept. 8, 1959   5 Sheets-Sheet 3

INVENTOR
Achille C. Sampietro
BY
Ralph B. Stewart
ATTORNEY

July 24, 1962 A. C. SAMPIETRO 3,045,773
FRONT WHEEL SUSPENSION SYSTEMS FOR AUTOMOBILE VEHICLES
Filed Sept. 8, 1959 5 Sheets-Sheet 4

INVENTOR
Achille C. Sampietro
BY
Ralph B. Stewart
ATTORNEY

INVENTOR
Achille C. Sampietro
BY
Ralph B. Stewart
ATTORNEY

United States Patent Office 3,045,773
Patented July 24, 1962

3,045,773
FRONT WHEEL SUSPENSION SYSTEMS FOR AUTOMOBILE VEHICLES
Achille C. Sampietro, 286 Puritan, Birmingham, Mich.
Filed Sept. 8, 1959, Ser. No. 838,488
5 Claims. (Cl. 180—43)

The present invention relates to front wheel suspension systems for automobile vehicles in which power is transmitted from the engine to the front wheels.

In front wheel drive vehicles, each front wheel is drivably interconnected to a power transmission system and must be so located to permit rotational movement of the wheel about its own axis, angular movement of the wheel about a substantially vertical axis for steering purposes, and vertical movement of the wheel relative to the frame of the vehicle against the action of the suspension spring. In prior known front wheel drive vehicles, each front wheel is rotatably mounted upon a member of the suspension mechanism, which member is in turn pivotally mounted to a further member of the suspension mechanism for angular movement about a substantially vertical axis, and power is transmitted to the wheel through a drive mechanism which is separate from the suspension mechanism.

One object of the present invention is to provide a front wheel suspension system for a front wheel drive automobile vehicle in which the output shaft of the drive mechanism forms an element of the suspension mechanism.

Another object is to provide a front wheel suspension system in which the front wheel is located by a universal joint on the output shaft of the drive mechanism, and a swivel joint on a swing arm of the suspension mechanism.

A further object is to provide a front wheel suspension system incorporating a belt and pulley transmission for transmitting power to the front wheel.

Figure 1:
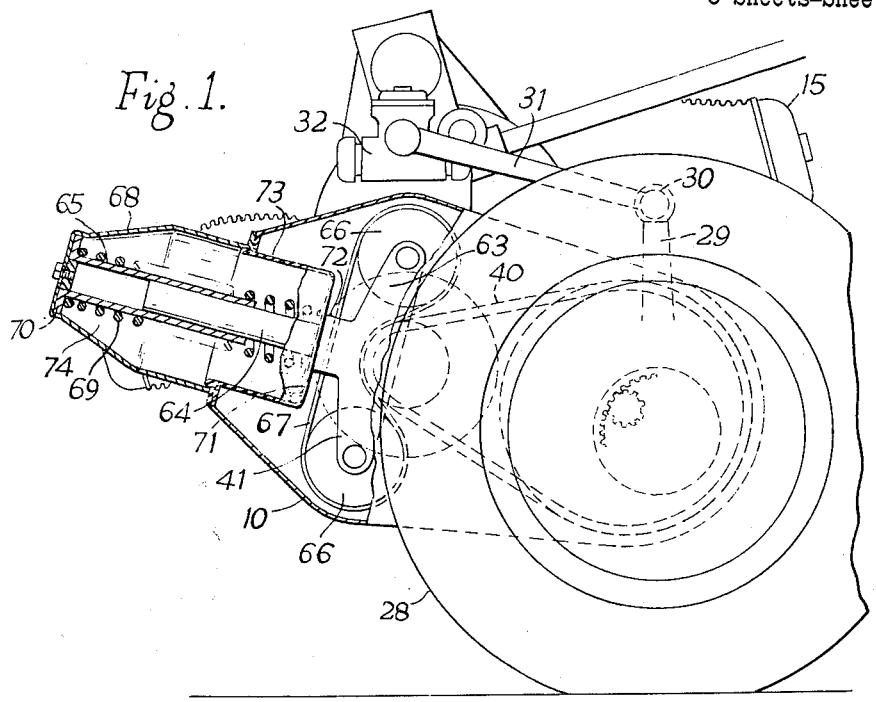
Figure 2:
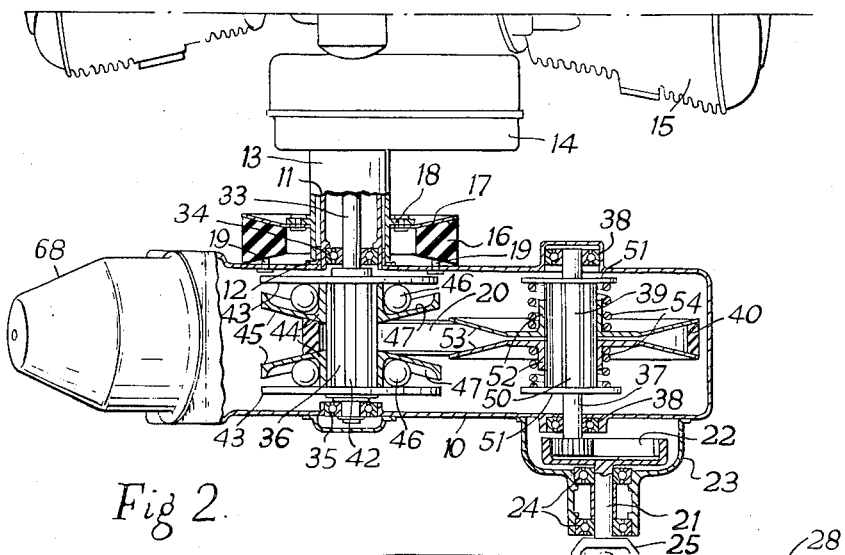
Figure 3:
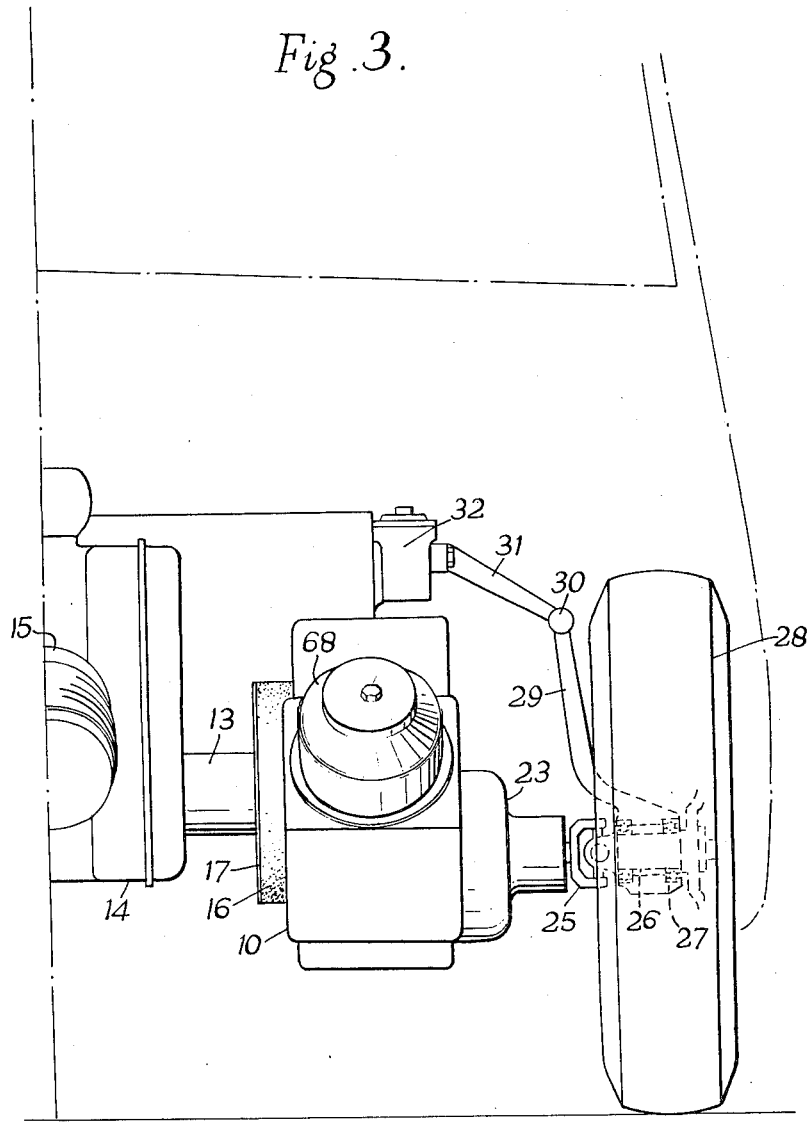
Figure 4:
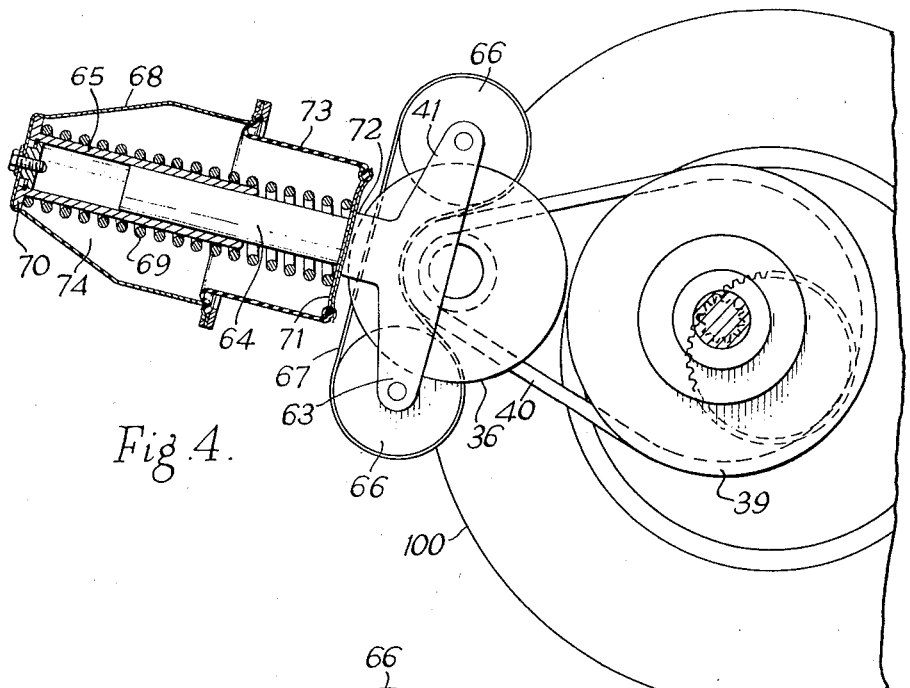
Figure 5:
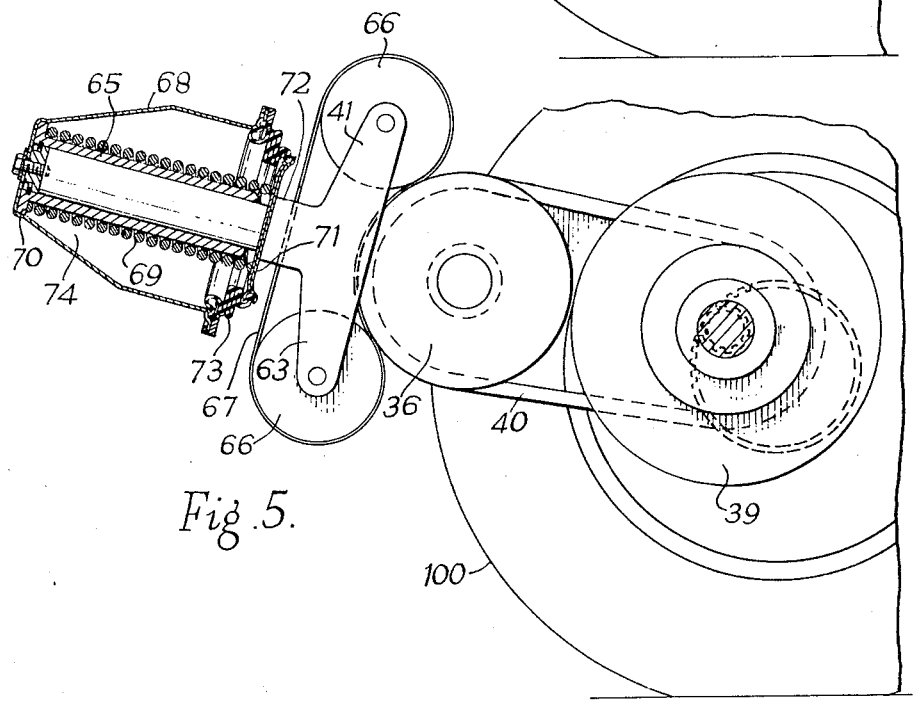
Figure 6:
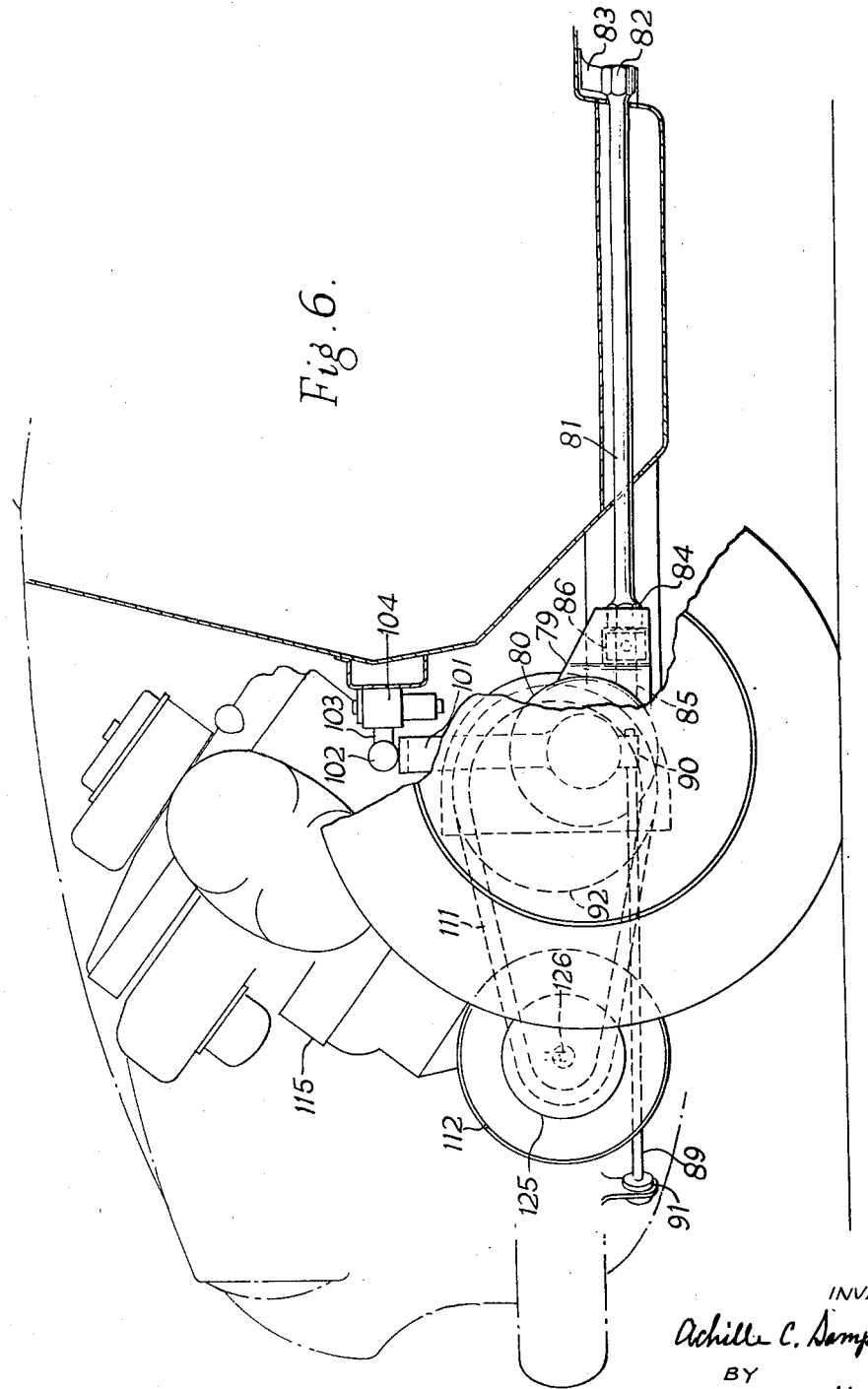
Figure 7:
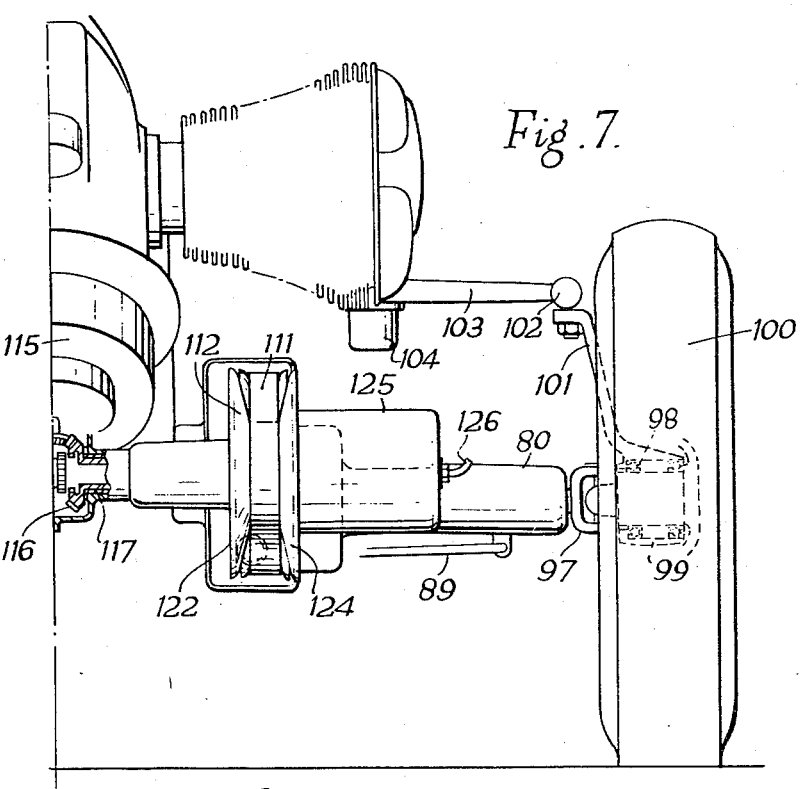
Figure 8:
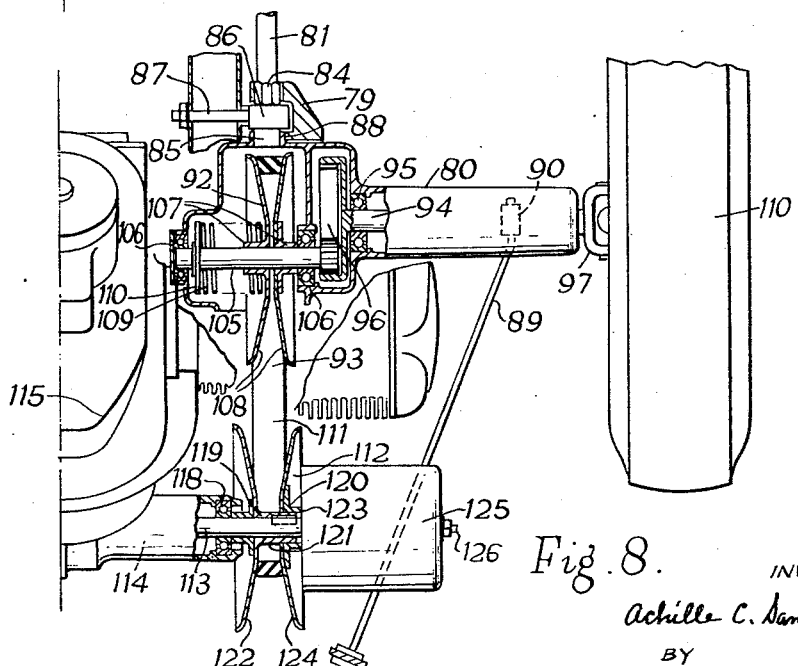

These and other objects will be more apparent after referring to the following specification and attached drawings showing embodiments of the invention. In these drawings:

FIG. 1 is a part sectional side elevation view of a front wheel suspension system incorporating a variable speed belt transmission mechanism having an auxiliary belt assembly for promoting adhesion of the main belt to an associated drive pulley, FIG. 2 is a part sectional plan view of the arrangement of FIG. 1, the auxiliary belt assembly being removed for clarity, FIG. 3 is a front elevation view of the arrangement of FIGS. 1 and 2, FIGS. 4 and 5 are part sectional side elevation views of the belt transmission mechanism of the arrangement of FIG. 1 showing the mechanism in its low speed gear ratio and high speed gear ratio settings respectively, FIG. 6 is a side elevation view of another construction of a front wheel suspension system according to the invention, FIG. 7 is a front elevation view of the arrangement of FIG. 6, and FIG. 8 is a part sectional plan view of the arrangement of FIGS. 6 and 7.

The front wheel suspension system of FIGS. 1–3, comprises a hollow swingarm 10 mounted on the outer end of a hollow shaft 11 rotatably mounted in plane bearings 12 within a tubular support 13 extending horizontally outwards from a gear casing 14 attached to the engine 15. The arm 10 is spring loaded by an annular rubber block 16 one side of which is bonded to a disc 17 bolted to a flange 18 projecting radially outwards from the support 13, and the other side of which is secured by bolts 19 to the swingarm 10. The arm 10 projects towards the rear and forms a housing for a belt transmission mechanism 20 arranged to drive a final drive shaft 21 through reduction gearing 22 mounted within a housing 23 on the rear end portion of the arm 10. The final drive shaft 21 is mounted in bearings 24 supported within the housing 23, and the shaft 21 extends outwardly from the housing 23 and is connected by a universal joint 25 to an axle shaft 26 (FIG. 3) rotatably mounted in an axle casing 27. The road wheel 28 is mounted on the axle shaft 26 for rotation therewith. The side of the axle casing adjacent the arm 10 is provided with an upwardly projecting link 29, the upper end of which is connected by a swivel joint 30 to the operating arm 31 of a shock absorber 32 mounted on the frame of the vehicle. The swivel joint 30 is positioned above the universal joint 25 and the arm 31 is pivotally mounted to the body of the shock absorber about an axis parallel to the axis of the pivot bearing 12 of the swingarm 10.

The swingarm 10 carrying the drive shaft 21, the arm 31 and the assembly consisting of the axle shaft 26, wheel 28 and axle casing 27 forms a linkage system which permits vertical movement of the assembly against the action of the rubber spring 16, while permitting angular movement of the assembly for steering purposes about a pivot axis extending through the swivel joint 30 and the universal joint 25. In addition the axle shaft 26 and wheel 28 are free to rotate within the axle casing 27 and are drivably connected to the engine through the belt transmission mechanism 20.

The belt transmission mechanism 20 comprises an input shaft 33 projecting outwardly through the hollow shaft 11 and rotatably mounted in an inner bearing 34 supported within the shaft 11 and an outer bearing 35 supported within an aperture in the outer wall of the swingarm 10, a variable diameter drive pulley 36 secured on the shaft 33, an output shaft 37 rotatably mounted in bearings 38 in the opposing walls of the swingarm 10 and drivably connected to the reduction gearing 22, a variable diameter driven pulley 39 secured on the shaft 37, a main belt 40 drivably interconnecting the pulleys 36, 39, and an auxiliary belt assembly 41 mounted on the front end of the swingarm 10 and arranged to apply the main belt to the drive pulley 36.

The drive pulley 36 comprises a drum 42 having end flanges 43, two members 44 splined on the drum and movable towards and away from each other, the adjacent ends of the two members having flanges 45 diverging radially outwards from ont another, and two annular series of steel balls 46 disposed one series between each flange 45 and its associated drum flange 43. The outer surfaces of the flanges 45 are provided with radial grooves 47 forming guide tracks for the balls 46, and the inner surfaces of the flanges 45 co-operate to form a V-groove for the main belt 40. The side walls of the belt 40 are inclined so as to conform with the inclination of the inner surfaces of the flanges 45.

The driven pulley 39 comprises a drum 50 having end flanges 51, two members 52 splined on the drum 50 and movable towards and away from each other, the adjacent ends of the two members 52 having flanges 53, and two coil springs 54 compressed one between each end flange 51 and the associated flange 53. The radially inner parts of the two flanges 53 extend radially outwards parallel to one another and the radially outer parts of the two flanges 53 diverge radially outwards from one another at an angle corresponding to the angle of inclination of the sides of the main belt 40. The two springs 54 urge the two members 52 towards one another and the radially outer parts of the flanges 53 form an annular V-groove for the main belt 40. The effective diameter of the driven pulley when in its maximum diameter position is considerably greater than the effective diameter of the drive pulley when in its maximum diameter position.

As shown in FIGS. 4 and 5, the auxiliary belt assembly 41 comprises a support bar 63 secured to the rear end of a piston 64 slidably mounted in a cylinder 65, two pulleys 66 mounted one at each end of the support bar 63 for rotation about axes parallel to the rotational axis of the drive pulley 36, and an auxiliary belt 67 mounted around the two pulleys 66 and arranged to engage a portion of the main belt 40 extending around the drive pulley 36. The front end of the cylinder 65 is disposed within and secured to the front end of a rigid conical housing 68 bolted to the front end of the swing arm 10, the cylinder 65 projecting through an aperture in the front end of the swing arm 10, and a coil spring 69 surrounding the cylinder 65 is compressed between a flange 70 on the front end of the cylinder and a disc 71 engaging an abutment 72 on the front end of the support bar 63. The rear end of a flexible sleeve 73 is bonded to the periphery of the disc 71 and the front end of the sleeve 73 is clamped between the rear end of the housing 68 and the swing arm 10 to form a sealed chamber 74 enclosed by the conical housing 68, the disc 71 and the sleeve 73. A conduit (not shown) effects communication between the chamber 74 and the inlet manifold of the engine, and the spring 69 thrusts the support bar 63 in a rearward direction against a forwardly acting force arising from the pressure difference across the disc 71, the rear surface of the disc 71 being subjected to atmospheric pressure, and the front surface of the disc 71 being subjected to the lower pressure of the engine inlet manifold. The resultant rearward thrust on the support bar 63 applies the auxiliary belt to the main belt with a force dependent upon the inlet manifold pressure, that is with the force dependent upon the engine loading which is proportional to the engine inlet manifold pressure. Under the pressure of the auxiliary belt, the main belt is applied more firmly against the drive pulley 36 than would otherwise be the case, so that the adhesion between the main belt and the pulley 36 and hence the maximum power which may be transmitted by the mechanism is increased.

Since the driven pulley 39 is considerably larger in diameter than the drive pulley 36, the driven pulley 39 does not require a separate auxiliary belt assembly to enable it to transmit the maximum power which the drive pulley 36 may transmit.

When the pulley 36 is rotated at a low speed the tension in the main belt, supplemented by the pressure of the auxiliary belt, exerts a wedging action on the two members 44, forcing them apart towards their respective end flanges 43, the balls 46 being then rotated near to the drum 42, as illustrated in FIG. 2. As the speed of the pulley 36 increases, the action of centrifugal force on the balls 46 is such as to urge them radially outwards, thereby moving the members 44 towards one another and causing the main belt and with it the auxiliary belt to move radially outwards, thereby increasing the effective diameter of the pulley 36 and so changing the speed ratio of the transmission system. The effective diameter of the pulley 36 is thus determined by a combination of engine speed and of engine loading. The springs 54 urging the driven pulley 39 into its maximum effective diameter position are arranged to exert a considerably smaller force than the forces regulating the effective diameter of the pulley 36, so that the effective diameter of the pulley 39 is regulated by the setting of the effective diameter of the pulley 36. The effective diameter of the pulley 36 thus controls the speed ratio of the belt transmission mechanism, and the components of the mechanism are designed to provide optimum speed ratios at any particular setting of engine speed and engine loading. FIG. 4 shows the belt transmission mechanism in its lowest speed gear ratio setting, and FIG. 5 shows the belt transmission mechanism in its highest speed gear ratio setting.

The front wheel suspension system of FIGS. 6-8 comprises a hollow swing arm 80 supported upon the front end of a torsion bar 81 mounted longitudinally in the frame of the vehicle. The rear end of the torsion bar 81 is provided with a hexagonal section head 82 mounted as a tight fit within a hexagonal aperture in the bracket 83 secured to the vehicle frame, and the front end of the torsion bar is provided with a hexagonal section head 84 and a stub shaft 85 extending forwardly in front of the head 84. The head 84 is mounted as a tight fit within a hexagonal aperture in a lug 79 secured to the rear wall of the swing arm 80, the wall of the lug 79 containing the hexagonal aperture being spaced from the rear wall of the swing arm 80, and the stub shaft 85 extends through a bearing 86 mounted by a bolt 87 on to a member of the vehicle frame and projects into a bearing 88 in the rear wall of the swing arm 80. The swing arm 80 is thus rigidly secured to the front end of the bar 81 and is free to pivot with the front end of the bar about the axis of the bearing 86, against the torsional spring of the bar 81 which is rigidly secured at its rear end to the vehicle frame. A thrust rod 89 for resisting fore and aft loads on the swing arm 80 has a rear end mounted in a rubber bushing 90 secured to the underside of the swing arm 80 adjacent the outer end thereof and a front end mounted in a rubber bushing 91 on the front of the vehicle frame, the rubber bushings 90, 91 permitting a small degree of longitudinal movement of the rod 89 relative to the frame and the swing arm 80 to allow the swing arm 80 to pivot in a vertical plane about the longitudinally extending axis through bearing 86.

The hollow swing arm 80 comprises an enlarged inner end portion which forms a housing for a variable diameter driven pulley 92 of a belt transmission mechanism 93 and an elongated outer end portion which forms a housing for a final drive shaft 94 mounted in bearings 95 (only one of which is shown in FIG. 8) in the swing arm. The inner end of the shaft 94 is drivably connected through reduction gearing 96 to the pulley 92 and the outer end of shaft 94 projects through the outer end of the swing arm 80 and is drivably connected by a universal joint 97 to an axle shaft 98 rotatably mounted within an axle casing 99. A road wheel 100 is mounted on the axle shaft 98 for rotation therewith. The side of the axle casing 99 adjacent the swing arm 80 is provided with an upwardly projecting link 101, the upper end of which is connected by a swivel joint 102 to an operating arm 103 of a shock absorber 104 mounted on the frame of the vehicle. The swivel joint 102 is positioned above the universal joint 97 and the arm 103 is pivotally mounted to the body of the shock absorber about an axis parallel to the axis of the bearing 86 for the swing arm 80.

The swing arm 80 carrying the drive shaft 94, the arm 103 and the assembly consisting of the axle shaft 98, wheel 100 and axle casing 99 form a linkage system which permits vertical movement of the assembly against the action of the torsional spring bar 81, while permitting angular movement of the assembly for steering purposes about a pivot axis extending through the swivel joint 102 and the universal joint 97. In addition the wheel 100 and axle shaft 98 are free to rotate within the axle casing 99 and are drivably connected to the engine through the belt transmission mechanism.

The pulley 92 comprises a shaft 105 rotatably mounted in bearings 106 supported within the swing arm 80, two members 107 splined on the shaft for rotation therewith, the adjacent ends of the two members 107 having flanges 108, and a coil spring 109 compressed between one of the members 107 and a collar 110 mounted on the shaft 105. The coil spring urges its adjacent member 107 towards the other member 107 which bears against the inner race of the adjacent bearing 106. The radially inner parts of the two flanges 108 extend radially outwards parallel to one another and the radially outer parts of the two flanges 108 diverge radially outwards from one another to form a V-groove for a V-section belt 111.

The pulley 92 is drivably connected by the belt 111 to a variable diameter pulley 112 mounted on a shaft 113 projecting from a tubular casing 114 on the engine 115. The shaft 113 has an enlarged inner end of tubular section which is provided with a bevel gear 116 meshing with a drive gear on the engine shaft, the remainder of the shaft 113 being of solid section, and the shaft 113 is rotatably mounted in an inner plain bearing 177 and an outer ball bearing 118 supported in the tubular casing 114. The pulley 112 comprises two members 119, 120, the member 119 consisting of a sleeve 121 secured to the shaft 113 for rotation therewith and a flange 122 on the end of the sleeve 121 adjacent the engine, and the member 120 consisting of a sleeve 123 splined on the sleeve 121 and a flange 124 on the end of the sleeve 123 adjacent the engine. The radially inner parts of the two flanges 122, 124 extend radially outwards parallel to one another and the radially outer parts of the two flanges 122, 124 diverge radially outwards to form a V-groove for reception of the belt 111. The effective diameter of the pulley 112 is adjusted by a servo motor 125 operative to regulate the position of the sleeve 123 on the sleeve 121, and hence regulate the spacing between the flanges 122, 124. The servo motor 125 is mounted on the shaft 113 for rotation therewith and is operative by fluid under pressure fed through a stationary inlet 126 rotatably mounted in a seal in the casing of the servo motor. The fluid is supplied by a pump driven by the engine and the output pressure of the pump is regulated by a needle valve which bypasses fluid from the outlet to the inlet of the pump, the valve being connected to the engine throttle and arranged to provide a small bypass opening for a small throttle opening and a large bypass opening for a large throttle opening. The servo motor may be of any suitable construction and may include centrifugal means for modifying the control exercised by the pressure fluid.

In operation, the effective diameter of the drive pulley 112 is adjusted in response to variations in engine torque or engine speed, by controlling the pressure of fluid fed to the servo motor, the forces exerted on the drive pulley 112 by the servo motor being greater than the force of the spring 109 urging the driven pulley 92 into its maximum diameter position whereby the effective diameter of the driven pulley 92 is regulated by the setting of the effective diameter of the drive pulley 112. Upon pivotal movement of the swing arm 80, the driven pulley 92 which is carried by the arm 80 will be displaced out of alignment with the driving pulley 112, but this will not affect the transmission of power since the belt will twist along its upper and lower runs to accommodate any misalignment of the two pulleys.

I claim:

1. In an automobile vehicle, a front wheel suspension system comprising a sleeve secured to the engine casing of the vehicle, a hollow lower swing arm, a tubular element secured to the hollow swing arm and rotatably mounted in said sleeve, a pivot bearing supported in said sleeve for the hollow swing arm, spring means comprising an annular block of elastic material surrounding the pivot axis of the hollow swing arm, one side of said block being bonded to an element secured to the engine casing and the other side of said block being bonded to an element secured to the hollow swing arm, power transmission means mounted within said lower swing arm, an input shaft rotatably mounted within said tubular element and drivably interconnecting the engine and said power transmission means, said power transmission means including a driving pulley mounted on said input shaft, an output shaft, a driven pulley mounted on said output shaft, said driving and driven pulleys being of variable effective diameter and including means urging the pulleys into their maximum diameter position during operation of the transmission means, a main belt drivably interconnecting the driving and driven pulleys, and an auxiliary belt assembly associated with the driving pulley, said auxiliary belt assembly comprising two auxiliary pulleys freely rotatable about axes parallel to the rotational axis of the driving pulley, an auxiliary belt drivably interconnecting the two auxiliary pulleys and arranged to press the main belt against the driving pulley, and means for moving at least one of the auxiliary pulleys to regulate the loading between the auxiliary and main belts and hence regulate the effective diameter of the driving pulley, reduction gearing, said output shaft extending outwardly through a side wall of the hollow swing arm and being drivably connected with said reduction gearing, a final drive shaft drivably connected to said reduction gearing, an axle casing, an axle shaft rotatably mounted in said axle casing, said axle shaft extending through said casing and being secured to a road wheel, an upper swing arm pivotally mounted to the frame of the vehicle about an axis parallel to the pivot axis of the lower swing arm, said upper swing arm being connected to the axle casing by a swivel joint, and a universal joint drivably interconnecting the axle shaft and the outer end of the said final drive shaft, said universal joint being positioned below the swivel joint, whereby the assembly consisting of the axle casing, the axle shaft and the wheel is located by the swivel joint and the universal joint and is free to pivot about a substantially vertical axis.

2. In an automobile vehicle, a front wheel suspension system comprising a hollow lower swing arm pivotally mounted to the vehicle about a substantially horizontal axis, power transmission means mounted within said lower swing arm, said power transmission means including a drive pulley drivably connected to the engine of the vehicle, a driven pulley, said driving and driven pulleys being of variable effective diameter and including means urging the driving and driven pulleys into their maximum diameter position during operation of the transmission means, a main belt drivably interconnecting the driving and driven pulleys, and an auxiliary belt assembly associated with the driving pulley, said assembly comprising two auxiliary pulleys freely rotatable about axes parallel to the rotational axis of the driving pulley, an auxiliary belt drivably interconnecting the two auxiliary pulleys and arranged to press the main belt against the driving pulley, and means for moving at least one of the auxiliary pulleys to regulate the loading between the auxiliary and main belts and hence regulate the effective diameter of the driving pulley, a final drive shaft drivably interconnected with said driven pulley and extending outwardly beyond the lower swing arm, an axle casing, an axle shaft rotatably mounted in said casing, said axle shaft extending through said casing and being secured to a road wheel, an upper swing arm pivotally mounted to the frame of the vehicle about an axis parallel to the pivot axis of the lower swing arm, said upper swing arm being connected to the axle casing by a swivel joint, and a universal joint drivably interconnecting the axle shaft and the outer end of the said final drive shaft, said universal joint being positioned below the swivel joint, whereby the assembly consisting of the axle casing, the axle shaft and the wheel is located by the swivel joint and the universal joint and is free to pivot about a substantially vertical axis.

3. A front wheel suspension system as set forth in claim 2, wherein the driving pulley comprises two rim portions movable towards and away from each other, the inner sides of the said rim portions diverging radially outwards from one another to form a V-groove, and said means urging the driving pulley into its maximum diameter position including centrifugal means operable to move said rim portions towards each other and thereby increase the effective diameter of the driving pulley with a force dependent upon the rotational speed of the driving pulley.

4. A front wheel suspension system as set forth in claim 2, wherein the driving pulley comprises a shaft rotatably mounted in bearings, two inner members mounted on the shaft for rotation therewith and movable towards and away from one another, the adjacent surfaces of said inner members having rim portions diverging radially outwards from one another to form a V-groove, two outer members positioned one on each side of the two inner members, the inner surface of each outer member converging radially outwards towards the outer surface of the adjacent inner member, and said means urging the driving pulley into its maximum diameter position including centrifugal elements disposed between each outer member and its associated inner member.

5. A front wheel suspension system as set forth in claim 4, wherein the interconnection of said final drive shaft and the driven pulley comprises an output shaft rotatably mounted in bearings in said hollow swing arm, and wherein said driven pulley comprises two inner members mounted on the last mentioned shaft for rotation therewith and movable towards and away from one another, the adjacent surfaces of said inner members having rim portions diverging radially outwards from one another to form a V-groove, and said means urging the driven pulley into its maximum position including spring means urging said inner members towards one another.

References Cited in the file of this patent
UNITED STATES PATENTS

| | | |
|---|---|---|
| 1,837,874 | Masury | Dec. 22, 1931 |
| 2,049,474 | Smith | Aug. 4, 1936 |
| 2,894,592 | Ordorica | July 14, 1959 |

FOREIGN PATENTS

| | | |
|---|---|---|
| 870,858 | France | Jan. 3, 1942 |
| 875,503 | France | June 22, 1942 |